June 3, 1958 — R. A. WITTREN — 2,836,960

HYDRAULIC POWER STEERING

Filed July 6, 1956 — 2 Sheets-Sheet 1

NEUTRAL

*INVENTOR.*
R. A. WITTREN

June 3, 1958  R. A. WITTREN  2,836,960
HYDRAULIC POWER STEERING

Filed July 6, 1956  2 Sheets-Sheet 2

RIGHT TURN — POWER

RIGHT TURN — MANUAL

*INVENTOR.*
R. A. WITTREN

2,836,960

HYDRAULIC POWER STEERING

Richard A. Wittren, Cedar Falls, Iowa, assignor to Deere Manufacturing Co., Dubuque, Iowa, a corporation of Iowa Application July 6, 1956, Serial No. 596,333

9 Claims. (Cl. 60—52)

This invention relates to a fluid pressure system and more particularly to such system as applied to hydraulic power steering.

The invention finds particular utility in the power steering of agricultural tractors; although, it will be apparent that the system is useful in comparable conditions and an ideal system will therefore incorporate a main pressure source, a control valve for mobilizing and demobilizing the steering motor and operative by a steering wheel or equivalent member, follow-up servo means for returning the control valve to neutral when movement of the steering wheel ceases, plus means for operating the steering system in the event of failure or other inactivity of the main pressure source.

One of the principal objects of the present invention is to afford a servo system utilizing fluid discharge from one or the other end of the steering motor as a hydraulic link to the control valve, thereby avoiding the necessity of using a separate sensing element in addition to the steering motor. A further object of the invention is to utilize an auxiliary pressure source, such as a pump connected to and driven by the steering wheel, for actively and neutrally positioning the control valve, and to so arrange the system as to eliminate undesirable motoring of the auxiliary or secondary pressure source during operation of the system by the main pressure source. It is a still further object of the invention to utilize a main circuit and a servo circuit including relief lines for accommodating fluid in excess of that necessary to actively position the control valve during normal operation of the system, plus means for governing the relief line pressure so that the volume of fluid otherwise directed to the reservoir is useful to mobilize the steering motor during inactivity of the main pressure source. The invention has for another object the provision of improved means for governing the relief valve means setting relative to the auxiliary pressure lines.

The foregoing and other important objects and desirable features inherent in and encompassed by the invention will become apparent as a preferred embodiment thereof is disclosed in detail in the ensuing specification and accompanying drawings, the several figures of which are described immediately below.

Figure 1:
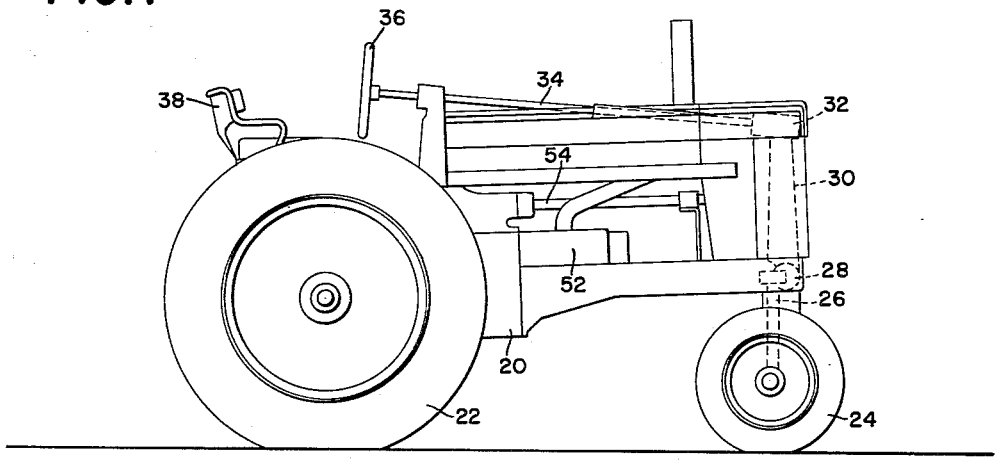
Fig. 1 is an elevational view of a typical agricultural tractor illustrating generally the embodiment of the invention therein.
Figure 2:
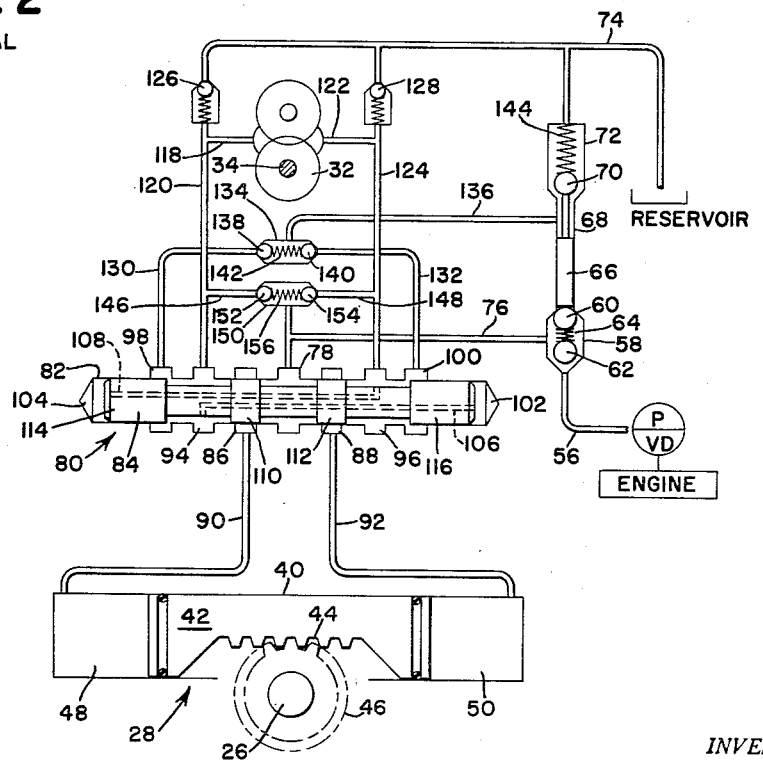
Fig. 2 is a schematic or circuit diagram of the steering system, with the parts shown in their neutral or inactive positions.
Figure 3:
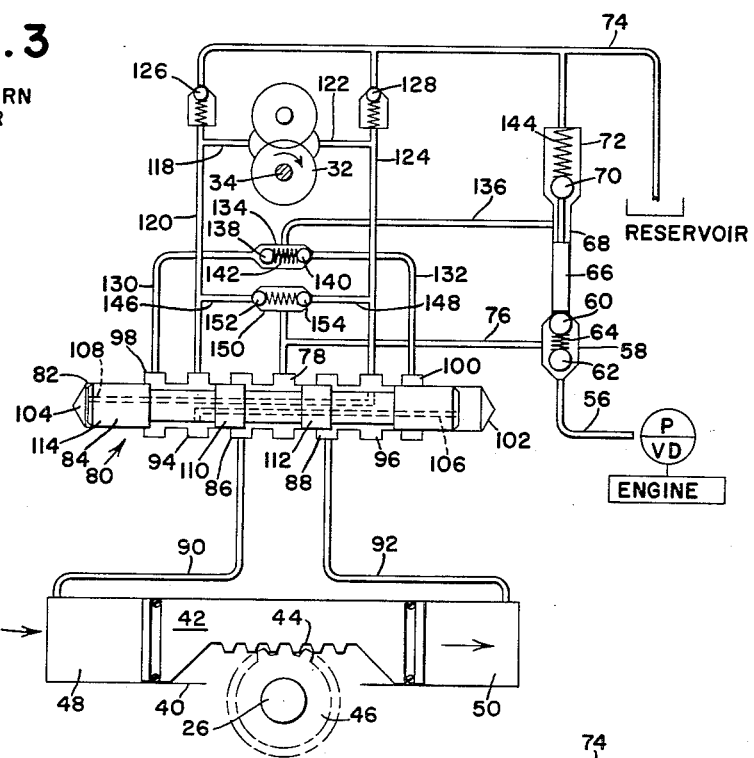
Fig. 3 is a similar diagram but showing the positions of the parts when a power operated right turn is being effected.
Figure 4:
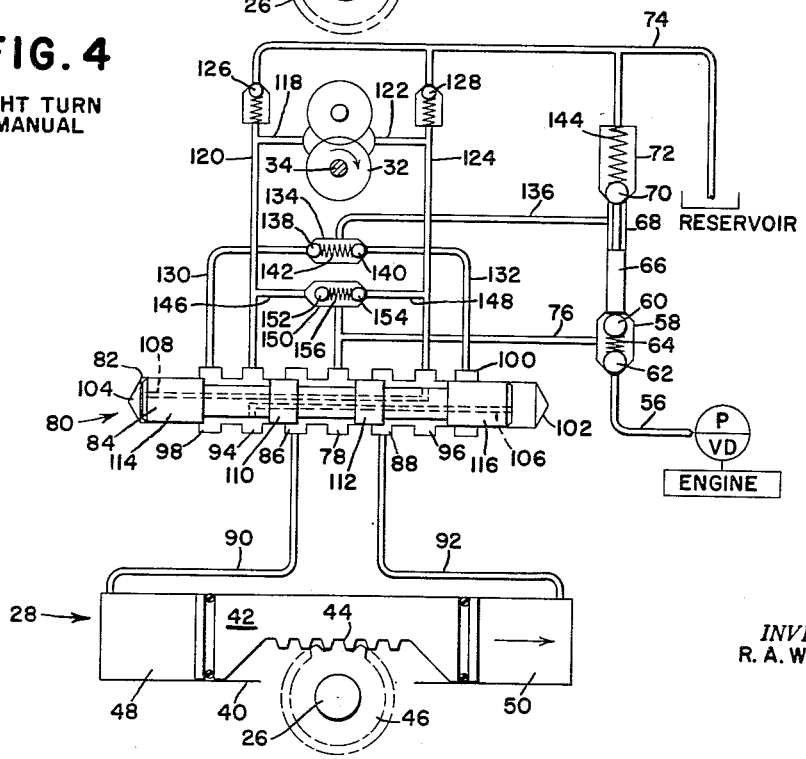
Fig. 4 is a similar diagram showing a right turn effected by the auxiliary pressure source.

The tractor chosen for the purposes of illustration will be recognized as a commercially popular type, having a fore-and-aft body 20 carried on rear traction wheels 22 (only one of which is visible) and a steerable front truck 24. The front part of the body 20 includes appropriate supporting or housing structure for accommodating an upright steering spindle 26, a bi-directional steering motor 28, a housing 30 which may serve as a reservoir, and a steering pump 32 which here represents an auxiliary source of pressure fluid. As seen in Figs. 2, 3 and 4, the pump 32 may be of any conventional gear type and one gear thereof is driven by a steering shaft 34 by means of a conventional steering wheel 36 conveniently located relative to an operator's seat 38 at the rear of the tractor body 20.

The bi-directional motor 28 is here shown as comprising a cylinder 40 which contains a piston 42 having a rack 44 in constant mesh with a pinion 46 that is keyed to the upper end of the steering spindle 26. The cylinder has opposite fluid-receivable ends 48 and 50, respectively, to which opposite ends of the piston 42 are exposed. The structure to the extent described is representative only and may be varied without sacrificing any of the benefits of the invention.

The tractor, as is usual, is equipped with an internal combustion engine 52 which drives, as via a shaft 54, a main pump, here identified by an appropriate legend as a variable displacement pump, the location of which on the tractor is immaterial to the present disclosure. This pump represents the main source of pressure fluid.

In the ensuing description, the expressions "right" and "left" will be used with reference to the position of an operator seated at 38 on the tractor and facing forwardly. The diagrams in Figures 2, 3, and 4 are arranged so that the same view is presented to the reader.

The main pump leads via a high pressure line 56 to a main pressure chamber 58 which contains a pair of check valve balls 60 and 62 held apart and biased to seated positions by an intermediate biasing means in the form of a relatively light compression spring 64. The upper ball 60 engages the lower end of a plunger 66 which operates in a suitable bore 68 and the upper reduced end of the plunger normally unseats a check valve ball 70 which constitutes a reservoir valve contained in a chamber 72 which leads to an exhaust line 74, which line in turn leads to a reservoir appropriately designated. As will hereinafter appear, the arrangement just described constitutes means for governing the relative settings between relief valve means and auxiliary pressure line means.

The main pressure chamber 58 leads via a fluid line 76 to an inlet port 78 of a main control valve designated in its entirety by the numeral 80. This valve includes an appropriate valve bore 82 in which a valve member 84 is axially shiftable to control the relationship between the inlet port 78 and a pair of motor ports 86 and 88 which lead via lines 90 and 92, respectively, to the ends 48 and 50 of the steering motor 28.

Axially spaced along the valve bore 82 are other ports, including first and second servo ports 94 and 96 and first and second relief ports 98 and 100. Opposite ends of the valve bore 82 are closed and afford first and second servo chambers 102 and 104 respectively connected to the servo ports by internal valve passages 106 and 108.

The valve member 84 includes intermediate lands 110 and 112 and a pair of end lands 114 and 116. When the valve is neutrally positioned, the motor ports 86 and 88 are cut off or isolated from the inlet port 78 and the servo ports 94 and 96 are connected respectively to their adjacent relief ports 98 and 100. As already indicated, the main pressure source is a variable delivery pump and the valve 84 is of the closed center type. Also, in the neutral position, high pressure in the line 56 will raise the lower ball 62 which will act through the spring 64 to seat the upper ball 60, thus avoiding any leakage through the plunger bore 68. At the same time, the ball 60 acts through the plunger 66 to unseat the reservoir valve 70.

Since the steering pump 32 is reversible, it has opposite sides alternately serviceable as discharge and intake sides, depending upon the direction of operation. In the ensuing description, right turns will be dealt with and it will therefore be assumed that the left hand side of the pump is its discharge side and the right hand side is its intake side. To this end, then, the pump is connected via a branch 118 to a servo line 120 which leads to the servo port 94. The opposite side of the pump has a branch 122 which is connected to a second servo line 124 which leads to the second servo port 96. The lines 120 and 124 are connected at their upper ends respectively via make-up valves 126 and 128 to the exhaust line 74.

The relief ports 98 and 100 are connected respectively by relief lines 130 and 132 to a relief chamber 134 which is in turn connected by a reservoir line 136 to the bore 68 of the governing means previously described, which bore leads to the reservoir via 72 and 74 when the reservoir valve 70 is open. The relief lines 130 and 132 are respectively under control of relief line check valves 138 and 140, and these valves are disposed in opposed relation and are biased to close the respective relief valve lines via biasing means in the form of a compression spring 142. The relief line balls 138 and 140, together with the reservoir valve 70, constitute relief valve means under control of the biasing means 142 for the balls 138 and 140 and a spring 144 for the ball 70. The spring 142 is relatively light, but the spring 144 is relatively heavy, the purpose of which will presently appear. For the moment, it is sufficient to note that the spring 144 is stronger than the spring 64 between the balls 60 and 62. As already indicated, the ball 70 is unseated against the bias of the spring 144 in the neutral condition of the system, because the pressure in the high pressure line unseats the ball 62 which in turn compresses the spring 64 and forces the plunger 66 upwardly to unseat the ball 70.

It is a feature of the invention that the steering wheel pump or auxiliary pressure source 32 is capable not only of shifting the valve 84 but of mobilizing the steering motor 28 by means of developing pressure which is transmitted to the inlet port 78. For this purpose, a pair of pump or auxiliary pressure lines 146 and 148 serve to connect opposite sides of the pump 32 to the inlet port 78 via an intervening chamber 150 that is connected to the port 78 in common with the high pressure line 76. The line 146 is a branch of the servo line 120 but since it leads from the side 118 of the pump 32 it may be considered a direct connection to the pump. It should be noted that the line 146 is in parallel with the servo chamber 102, via internal valve passage 106 and port 94, as respects the line 120. The same may be said of the other line 148 relative to the servo line 124 and second servo chamber 104. The chamber 150 contains a pair of pressure line check valve balls 152 and 154 which are biased to closed positions by biasing means comprising a compression spring 156.

Neutral—Fig. 2

With the tractor operating straight-ahead, or in any other direction in which no steering is effected, the main pump will be driven by the engine and the pressure in the high pressure line 56 will unseat the ball 62 and seat the ball 60, driving the plunger 66 upwardly to unseat the reservoir ball 70. In this respect, it should be noted that the ball 60 acts in effect as a head on the plunger 66 and the ball and plunger could as well be of one piece construction, except that certain economies in manufacture are obtained by the separate construction. Since there is no need for steering at this time (hypothetically), there will be no demand made on the main source of pressure, which as disclosed here is a variable-displacement pump and is currently at "no stroke," and the valve 80 will retain its neutral status and the motor 28 will be immobilized. The remaining valves at 138, 140, 152, 154, 126 and 128 will be closed. The steering wheel 36 will be stationary and accordingly the pump 32 will be idle. The lands 110 and 112 on the valve member 84 will hydraulically lock the steering motor 28.

Right turn—Power—Fig. 3

This type of turn is effected by turning the steering wheel 36 to the right, or in a clockwise direction as viewed from the operator's seat, as indicated by the arrow in Fig. 3. The line 118 from the pump 32 now becomes a discharge line and the fluid pressure rise in the connected line 120 is transmitted by the valve port 94 and internal passage 106 to the servo chamber 102, whereupon the valve member 84 is shifted to the left. At the same time, the intake side of the pump 32 withdraws fluid from the other servo chamber 104 via the internal valve passage 108, servo port 96 and lines 124—122. Because of the high pressure in the line 76 and chamber 150, the balls 152 and 154 will remain seated. The spring 142 between the balls 138 and 140 normally keeps these balls seated to incur a pressure rise sufficient to cause shifting of the valve 84 to the left as already described.

After the valve has shifted to the left, the high pressure port 78 is connected to the motor port 86 and fluid is supplied via the line 90 to the chamber 48 at the left hand end of the steering motor cylinder 40, the piston 42 thus moving to the right and turning the steering spindle pinion 46 in a clockwise direction, or to the right. During this phase of the operation, the relief port 98 is in constant communication with the servo port 94, and fluid discharged by the pump 32, after the valve 84 has shifted, will open the valve at 138 for exhaust of fluid to the reservoir, it being recalled that the reservoir ball 70 has been unseated by the plunger 66.

Fluid discharged from the motor chamber 50 returns via the line 92, port 88, port 96 and lines 124—122 to the intake side of the pump 32. The valve 84, when shifted to the left, cuts out the relief port 100 so that this discharge is supplied to the pump 32 rather than to the reservoir. At the same time, the port 96 is in communication with the servo chamber 104 via valve passage 108 so that, if the operator ceases turning the steering wheel, the pump 32 becomes idle and will no longer accept fluid pressure; hence, this pressure is then supplied to the servo chamber 104 to shift the valve 84 to the right and thus return the valve to neutral. In other words, the valve 84 is hydraulically linked to the pump 32 and as soon as the pump 32 stops, the valve 84 will be returned to neutral and when this occurs the steering motor 28 is accordingly immobilized.

Since the system is symmetrical at each side, left hand power turns will be accomplished in a manner that will be apparent from the foregoing.

Right turn—Manual—Fig. 4

In the event of inactivity of the main pressure source, regardless of the reason, the system is capable of manual operation. On that basis, inactivity of the main source of pressure causes a pressure loss in the line 56, with the result that the spring 64 seats the ball 62, since the spring is opposed by the reservoir valve spring 144 through the ball 70, plunger 66 and ball 60. The ball 62, when seated, prevents return flow to the main pump. Consequently, when the steering wheel is turned to the right or clockwise as viewed from the operator's station, the pump 32 is operated so that the line 118 becomes the discharge side and this supplies fluid under pressure via the servo line 120 to the port 94. This port is in communication via the internal valve passage 106 with the servo chamber 102 so that continued turning of the pump 32 results in shifting of the valve 84 to the left just as in right hand power turning. Also as before, the other servo chamber 102 is connected by the passage 108 in the valve 84 to the other port 96 which in turn leads via the lines 124—122 to the intake side of the pump 32. Again, the other relief port 100 is cut off by the valve land 116.

In power operation, the reservoir valve 70 was positively unseated by the plunger 66, but this condition does not obtain in manual steering. Hence, the entire relief valve means, made up by the balls 138 and 140, plus the reservoir ball 70, has a setting higher than that of the pump line valve at 152. Accordingly, the valve 152 will open before the valve 138. Therefore, continued discharge from the pump 32 is transmitted via the branch line 146 to the inlet port 78 and thence via the motor port 86 to the left hand end of the steering motor 28, whereupon the pressure developed will move the motor piston 42 to the right to accomplish steering to the right. Discharge from the motor 28 is returned to the intake side of the pump 32 via the line 92, ports 88 and 96 and lines 124 and 122.

As previously stated, seating of the ball 62 prevents return flow to the main pump and accordingly a closed circuit is achieved. Any leakage loss from this closed circuit is made up from the reservoir through the make-up valves 126 or 128, depending upon the direction of steering.

Summary

One of the primary characteristics of the system is its simplicity and economy. A secondary servo or sensing motor is not required, since the servo signal is taken from the discharge end of the steering motor. Another feature is the relationship of the relief valve means 138—140—70 which functions at a low setting during power steering to accommodate discharge from the pump 32 but which functions at a higher setting during manual steering to insure that the output of the pump 32 will be delivered to the steering motor 28 at a pressure sufficient for manual steering operation. It may be desirable to incorporate the relief valve means entirely in the chamber 134, such as by eliminating the reservoir ball 70 and increasing the value of the load on the spring 142.

Other modifications will be readily apparent on the basis of the present disclosure. Features not specifically enumerated will also occur to those versed in the art, and these additional features and modifications may be obtained without departing from the spirit and scope of the invention.

What is claimed is:

1. In a hydraulic power steering system including a steering motor having opposite fluid-receivable ends, a main fluid pressure source, a reservoir and a reversible steering pump having opposite sides alternately serviceable as discharge and intake sides depending upon the direction of steering, the improvements comprising: a bi-directional control valve selectively actively and neutrally positionable to respectively mobilize and demobilize the motor and having an inlet port connected to the main pressure source, a pair of motor ports connected respectively to opposite ends of the motor and disconnected from the inlet port when the control valve is neutrally positioned, first and second servo ports, and first and second relief ports connected respectively to the servo ports when the control valve is neutrally positioned; a pair of relief lines connecting the relief ports to the reservoir; relief valve means normally preventing relief line flow to the reservoir and including in each relief line a biased check valve yieldably opposing flow to the reservoir; means affording first and second opposed fluid-receivable servo chambers connected respectively to the first and second servo ports and associated with and for actively and neutrally positioning the control valve; a pair of servo lines connecting the servo ports respectively to the opposite sides of the steering pump so that operation of said pump in one direction pressurizes the first servo chamber via the first servo port and withdraws fluid from the second servo chamber via the second servo port to actively position the control valve; and said control valve being so constructed that when it is thus actively positioned the inlet port is connected to one motor port, the other motor port is connected to the second servo port and the second relief port is cut off from the second servo port, whereby fluid pressure from said other end of the motor is conducted to the intake side of the pump via the second servo line and is conducted also to the second servo chamber so that cessation of operation of the pump incurs neutral positioning of the control valve.

2. The invention defined in claim 1, including: means governing the setting of the relief valve means to produce a relatively low setting during operation of the main pressure source and a relatively high setting when said main source is inactive; and a pair of pump lines connecting opposite sides of the steering pump to the inlet port, each pump line including a check valve biased to close said pump line against pressure in the inlet port, the respective pump line check valve being openable in response to an increase in pump line pressure above that in the inlet port so that the steering pump is operative, in addition to actively positioning the control valve to mobilize the steering motor when the main source is inactive.

3. The invention defined in claim 2, in which: the relief valve means includes a relief line chamber connected to the relief lines and containing the relief line check valves in opposed relation, and said relief valve means further includes a reservoir line leading from the relief line chamber to the reservoir and containing a reservoir valve biased to close said reservoir line, during inactivity of the main pressure source, by biasing means set at a value higher than that of the pump line check valves; and said means for governing the setting of the relief valve means includes means responsive to operation of the main pressure source to positively maintain the reservoir valve open so that the relief lines are controlled by only the relief line check valves.

4. The invention defined in claim 3, in which: the reservoir line includes a valve seat on which the reservoir valve is seatable by its biasing means; and said governing means includes a plunger engaged at one end with and for unseating the reservoir valve, said plunger having means at its other end exposed to pressure from the main pressure source.

5. In a hydraulic power steering system including a steering motor having opposite fluid-receivable ends, a main fluid pressure source, a reservoir, and a reversible steering pump having opposite sides alternately serviceable as discharge and intake sides depending upon the direction of steering, the improvements comprising: a bi-directional control valve selectively actively and neutrally positionable to respectively mobilize and demobilize the motor and having an inlet port connected to the main pressure source, a pair of motor ports connected respectively to opposite ends of the motor and disconnected from the inlet port when the control valve is neutrally positioned, and first and second servo ports; means affording first and second opposed fluid-receivable servo chambers connected respectively to the first and second servo ports and associated with and for actively and neutrally positioning the control valve; a pair of servo lines connecting the servo ports respectively to the opposite sides of the steering pump so that operation of said pump in one direction pressurizes the first servo chamber via the first servo port and withdraws fluid from the second servo chamber via the second servo port to actively position the control valve; and said control valve being so constructed that when it is thus actively positioned the inlet port is connected to one motor port and the other motor port is connected to the second servo port, whereby fluid pressure from said other end of the motor is conducted to the intake side of the pump via the second servo line and is conducted also to the second servo chamber so that cessation of operation of the pump incurs neutral positioning of the control valve.

6. In a hydraulic power control system including a motor having opposite fluid-receivable ends, a main fluid pressure source, a reservoir, and a reversible auxiliary pressure source having opposite sides alternately serviceable as discharge and intake sides depending upon the direction of operation, the improvements comprising: a bi-directional control valve selectively actively and neutrally positionable to respectively mobilize and demobilize the motor and having an inlet port connected to the main pressure source, a pair of motor ports connected respectively to opposite ends of the motor and disconnected from the inlet port when the control valve is neutrally positioned, first and second servo ports, and first and second relief ports connected respectively to the servo ports when the control valve is neutrally positioned; a pair of relief lines connecting the relief ports to the reservoir; relief valve means normally preventing relief line flow to the reservoir and including in each relief line a biased check valve yieldably opposing flow to the reservoir; means affording first and second opposed fluid-receivable servo chambers connected respectively to the first and second servo ports and associated with and for actively and neutrally positioning the control valve; a pair of servo lines connecting the servo ports respectively to the opposite sides of the auxiliary pressure source so that operation of said auxiliary source in one direction pressurizes the first servo chamber via the first servo port and withdraws fluid from the second servo chamber via the second servo port to actively position the control valve; and said control valve being so constructed that when it is thus actively positioned the inlet port is connected to one motor port, the other motor port is connected to the second servo port and the second relief port is cut off from the second servo port, whereby fluid pressure from said other end of the motor is conducted to the intake side of the auxiliary source via the second servo line and is conducted also to the second servo chamber so that cessation of operation of the auxiliary source incurs neutral positioning of the control valve.

7. The invention defined in claim 6, including: means governing the setting of relief valve means to produce a relatively low setting during operation of the main pressure source and a relatively high setting when said main source is inactive; a pair of auxiliary pressure lines connecting opposite sides of the auxiliary pressure source to the inlet port, each auxiliary pressure line including a check valve biased to close said auxiliary pressure line against pressure in the inlet port, the respective auxiliary pressure line check valve being openable in response to an increase in auxiliary pressure line pressure above inlet port pressure so that the auxiliary pressure source is operative, in addition to actively positioning the control valve to mobilize the motor when the main source is inactive.

8. The invention defined in claim 7, in which: the relief valve means includes a relief line chamber connected to the relief lines and containing the relief line check valves in opposed relation, and said relief valve means further includes a reservoir line leading from the relief line chamber to the reservoir and containing a reservoir valve biased to close said reservoir line during inactivity of the main pressure source, by biasing means set at a value higher than that of the auxiliary pressure line check valves; and said means for governing the setting of the relief valve means includes means responsive to operation of the main pressure source to positively maintain the reservoir valve open so that the relief lines are controlled by only the relief line check valves.

9. In a hydraulic power control system including a motor having opposite fluid-receivable ends, a main fluid pressure source, a reservoir, and a reversible auxiliary pressure source having opposite sides alternately serviceable as discharge and intake sides depending upon the direction of operation, the improvements comprising: a bi-directional control valve selectively actively and neutrally positionable to respectively mobilize and demobilize the motor and having an inlet port connected to the main pressure source, a pair of motor ports connected respectively to opposite ends of the motor and disconnected from the inlet port when the control valve is neutrally positioned, and first and second servo ports; means affording first and second opposed fluid-receivable servo chambers connected respectively to the first and second servo ports and associated with and for actively and neutrally positioning the control valve; a pair of servo lines connecting the servo ports respectively to the opposite sides of the auxiliary pressure source so that operation of said auxiliary source in one direction pressurizes the first servo chamber via the first servo port and withdraws fluid from the second servo chamber via the second servo port to actively position the control valve; and said control valve being so constructed that when it is thus actively positioned the inlet port is connected to one motor port and the other motor port is connected to the second servo port, whereby fluid pressure from said other end of the motor is conducted to the intake side of the auxiliary source via the second servo line and is conducted also to the second servo chamber so that cessation of operation of the auxiliary source incurs neutral positioning of the control valve.

References Cited in the file of this patent

UNITED STATES PATENTS

| | | |
|---|---|---|
| 2,020,951 | Lemon | Nov. 12, 1935 |
| 2,236,467 | Clench | Mar. 25, 1941 |
| 2,637,303 | Cintron | May 5, 1953 |